US010652518B2

(12) United States Patent
Cho et al.

(10) Patent No.: US 10,652,518 B2
(45) Date of Patent: *May 12, 2020

(54) MULTI-LENS BASED CAPTURING APPARATUS AND METHOD

(71) Applicant: SAMSUNG ELECTRONICS CO., LTD., Suwon-si (KR)

(72) Inventors: Yang Ho Cho, Seongnam-si (KR); Dong Kyung Nam, Yongin-si (KR); Hyoseok Hwang, Suwon-si (KR); Young Ju Jeong, Yongin-si (KR); Jingu Heo, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/252,873

(22) Filed: Jan. 21, 2019

(65) Prior Publication Data

US 2019/0158810 A1   May 23, 2019

Related U.S. Application Data

(63) Continuation of application No. 15/609,936, filed on May 31, 2017, now Pat. No. 10,187,627.

(30) Foreign Application Priority Data

Nov. 25, 2016  (KR) .......................... 10-2016-0158539

(51) Int. Cl.
*H04N 13/229*   (2018.01)
*G02B 13/00*   (2006.01)
(Continued)

(52) U.S. Cl.
CPC ....... *H04N 13/229* (2018.05); *G02B 13/0085* (2013.01); *H04N 5/2254* (2013.01); *H04N 13/106* (2018.05); *G06T 2207/10052* (2013.01)

(58) Field of Classification Search
CPC .................................................. H04N 13/0228
See application file for complete search history.

(56) References Cited

U.S. PATENT DOCUMENTS 7,773,143 B2 *  8/2010  Feldman ................ H04N 5/349
                                                    348/340
10,303,041 B2 *  5/2019  Sharma .................. G03B 13/36
(Continued)

FOREIGN PATENT DOCUMENTS

JP   2005-109092 A   4/2005
JP     5127899 B2    1/2013
(Continued)

OTHER PUBLICATIONS

Communication dated Jan. 5, 2018 by the European Patent Office in counterpart European Patent Application No. 17181576.4.
(Continued)

*Primary Examiner* — Christopher K Peterson
(74) *Attorney, Agent, or Firm* — Sughrue Mion, PLLC

(57) ABSTRACT

A multi-lens based capturing apparatus and method are provided. The capturing apparatus includes a lens array including lenses and a sensor including sensing pixels, wherein at least a portion of sensing pixels in the sensor may generate sensing information based on light entering through different lenses in the lens array, and light incident on each sensing pixel, among the portion of the plurality of sensing pixels may correspond to different combinations of viewpoints.

26 Claims, 11 Drawing Sheets

(51) Int. Cl.
    *H04N 13/106*   (2018.01)
    *H04N 5/225*   (2006.01)
    *G02B 3/00*   (2006.01)

(56) References Cited

U.S. PATENT DOCUMENTS

| | | |
|---|---|---|
| 2004/0032525 A1 | 2/2004 | Aharon |
| 2006/0249765 A1 | 11/2006 | Hsieh |
| 2012/0229691 A1 | 9/2012 | Hiasa et al. |
| 2013/0083233 A1 | 4/2013 | Fukami |
| 2013/0335621 A1 | 12/2013 | Attar et al. |
| 2014/0333787 A1 | 11/2014 | Venkataraman et al. |
| 2015/0192758 A1 | 7/2015 | Yamagata et al. |
| 2016/0353082 A1 | 12/2016 | Pitts et al. |
| 2018/0047185 A1 | 2/2018 | Boisson et al. |

FOREIGN PATENT DOCUMENTS

| | | |
|---|---|---|
| JP | 5943596 B2 | 7/2016 |
| KR | 10-2014-0094395 A | 7/2014 |
| KR | 10-2016-0091083 A | 8/2016 |
| WO | 2012/140397 A2 | 10/2012 |
| WO | 2014/129216 A1 | 8/2014 |

OTHER PUBLICATIONS

J.M. Rodriguez-Ramos et al., "3D imaging and wavefront sensing with a plenoptic objective", Proc. of SPIE, May 19, 2011, vol. 8043, pp. 80430R-1-80430R-11, XP002713964, (11 total pages).

* cited by examiner

MULTI-LENS BASED CAPTURING APPARATUS AND METHOD

CROSS-REFERENCE TO RELATED APPLICATION

This application is a continuation application of U.S. application Ser. No. 15/609,936 filed on May 31, 2017, which claims priority from Korean Patent Application No. 10-2016-0158539, filed on Nov. 25, 2016, in the Korean Intellectual Property Office, the disclosure of which are incorporated herein by reference in its entirety.

BACKGROUND

1. Field

Methods and apparatuses consistent with exemplary embodiments relate to a multi-lens based capturing apparatus and method.

2. Description of the Related Art

Due to development of optical technologies and image processing technologies, capturing apparatuses are being utilized in a wide range of fields, for example, multimedia content, security and recognition. For example, a capturing apparatus may be mounted in a mobile device, a camera, a vehicle or a computer, and may be configured to capture an image, to recognize an object or to acquire data to control a device. A volume of a capturing apparatus may be determined based on, for example, a size of a lens, a focal length of a lens or a size of a sensor. For example, the volume of the capturing apparatus may be adjusted based on a size of a lens or a size of a sensor. As the size of the sensor decreases, an amount of light incident on the sensor may decrease. Accordingly, a resolution of an image may decrease, or it may be difficult to perform capturing in a low illuminance environment. To reduce the volume of the capturing apparatus, a multi-lens including small lenses may be used. When the size of the lens decreases, a focal length of the lens may decrease. Accordingly, the volume of the capturing apparatus may be reduced based on the multi-lens.

SUMMARY

Example embodiments may address at least the above problems and/or disadvantages and other disadvantages not described above. Also, the example embodiments are not required to overcome the disadvantages described above, and an example embodiment may not overcome any of the problems described above.

According to an aspect of an exemplary embodiment, there is provided a capturing apparatus including: a lens array having a plurality of lenses; and a sensor having a plurality of sensing pixels, where at least a portion of the plurality of sensing pixels in the sensor may generate sensing information based on light entering through different lenses in the lens array, and light incident on each sensing pixel, among the portion of the plurality of sensing pixels, may correspond to different combinations of viewpoints.

In the capturing apparatus, a number of the plurality of sensing pixels in the sensor and a number of the plurality of lenses in the lens array may be relatively prime.

In the capturing apparatus, a ratio between a number of the plurality of sensing pixels and a number of the plurality of lenses may be a real number.

In the capturing apparatus, a matrix indicating a corresponding relationship between the portion of the plurality of sensing pixels and the viewpoints may have a full rank.

The capturing apparatus may further include a processor that may be configured to generate a captured image based on the sensing information and a transformation matrix determined based on a corresponding relationship between the portion of the plurality of sensing pixels and the viewpoints.

The processor may be further configured to: generate a sensing information matrix based on the sensing information, determine pixel values that correspond to the viewpoints based on the sensing information matrix and the transformation matrix, the pixel values being included in a pixel value matrix, and generate the captured image based on the pixel values.

In the capturing apparatus, a focal length of the lens array may be determined based on a number of lenses in the lens array.

In the capturing apparatus, a focal length of the lens array may decrease when a number of lenses in the lens array increases.

According to an aspect of an another exemplary embodiment, there is provided a capturing method including: acquiring sensing information from a plurality of sensing pixels and generating a captured image based on the sensing information, where at least a portion of the plurality of sensing pixels may be configured to generate the sensing information based on light entering through different lenses in a lens array comprising a plurality of lenses, and light incident on each sensing pixel, among the portion of the plurality of sensing pixels, may correspond to different combinations of viewpoints.

In the capturing method, a number of the plurality of sensing pixels and a number of the plurality of lenses in the lens array may be relatively prime.

In the capturing method, a ratio between a number of the plurality of sensing pixels and a number of the plurality of lenses may be a real number.

In the capturing method, a matrix indicating a corresponding relationship between the portion of the plurality of sensing pixels and the viewpoints may have a full rank.

In the capturing method, the generating of the captured image may include generating the captured image based on the sensing information and a transformation matrix determined based on a corresponding relationship between the portion of the plurality of sensing pixels and the viewpoints.

In the capturing method, the generating of the captured image may include generating a sensing information matrix based on the sensing information; determining pixel values that correspond to the viewpoints based on the sensing information matrix and the transformation matrix, the pixel values being included in a pixel value matrix; and generating the captured image based on the pixel values.

In the capturing method, a focal length of the lens array may be determined based on a number of lenses in the lens array.

In the capturing method, a focal length of the lens array may decrease when a number of lenses in the lens array increases.

According to an aspect of an another exemplary embodiment, there is provided a non-transitory computer-readable storage medium storing a program for causing a processor to perform the capturing method including: acquiring sensing information from a plurality of sensing pixels and generating a captured image based on the sensing information, where at least a portion of the plurality of sensing pixels may be configured to generate the sensing information based on light entering through different lenses in a lens array comprising a plurality of lenses, and light incident on each sensing pixel, among the portion of the plurality of sensing pixels, may correspond to different combinations of viewpoints.

According to an aspect of an another exemplary embodiment, there is provided a capturing apparatus including a processor; and a memory having an instruction readable by a computer, where when the instruction is executed by the processor, the processor may be configured to acquire sensing information from a plurality of sensing pixels and to generate a captured image based on the sensing information. The sensing information may be generated by at least a portion of the plurality of sensing pixels based on light entering through different lenses in a lens array comprising a plurality of lenses, where light incident on each sensing pixel, among the portion of the plurality of sensing pixels may correspond to different combinations of viewpoints.

In the capturing apparatus, a number of the plurality of sensing pixels in the sensor and a number of the plurality of lenses in the lens array may be relatively prime In the capturing apparatus, a ratio between a number of the plurality of sensing pixels and a number of the plurality of lenses may be real number.

In the capturing apparatus, a matrix indicating a corresponding relationship between the portion of the plurality of sensing pixels and the viewpoints may have a full rank.

The processor may be further configured to generate the captured image based on the sensing information and a transformation matrix may be determined based on a corresponding relationship between the portion of the plurality of sensing pixels and the viewpoints.

The processor may be further configured to: generate a sensing information matrix based on the sensing information, determine pixel values that correspond to the viewpoints based on the sensing information matrix and the transformation matrix, the pixel values being included in a pixel value matrix, and generate the captured image based on the pixel values.

According to an aspect of an another exemplary embodiment, there is provided a capturing apparatus including: a lens array comprising a plurality of lenses; and a sensor comprising a plurality of sensing pixels, where a ratio between a number of the plurality of sensing pixels and a number of the plurality of lenses is a real number, and a first light pattern incident on a first sensing pixel, among the plurality of sensing pixels, is different from a second light pattern incident on a second sensing pixel, among the plurality of sensing pixels.

The first light pattern may correspond to a first combination of viewpoints points and the second light pattern may correspond to a second combination of viewpoints points.

The first combination of viewpoints may be different from the second combination of viewpoints.

BRIEF DESCRIPTION OF THE DRAWINGS

The above and/or other aspects of exemplary embodiments will become apparent and more readily appreciated from the following detailed description of exemplary embodiments, taken in conjunction with the accompanying drawings of which.

DETAILED DESCRIPTION

Figure 1:
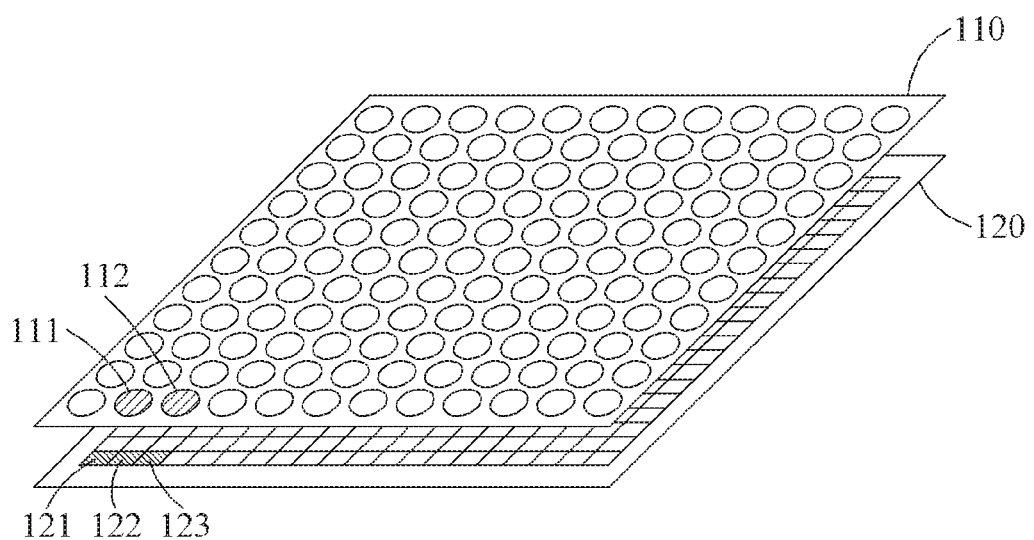
FIG. 1 is a diagram illustrating a capturing apparatus according to an exemplary embodiment.

The following structural or functional descriptions are exemplary to merely describe the exemplary embodiments, and the scope of the exemplary embodiments is not limited to the descriptions provided in the present specification. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

As used herein, the singular forms are intended to include the plural forms as well, unless the context clearly indicates otherwise. It should be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, exemplary embodiments will be described in detail with reference to the accompanying drawings, and like reference numerals in the drawings refer to like elements throughout.

FIG. 1 is a diagram illustrating a capturing apparatus according to an exemplary embodiment.

Prior to description of the capturing apparatus, brief description will be provided on factors used to determine a volume of the capturing apparatus and a quality of an image captured by the capturing apparatus according to an exemplary embodiment.

According to an exemplary embodiment, the quality of the image captured by the capturing apparatus may be determined based on a number of sensing pixels included in a sensor and an amount of light incident on a sensing pixel. For example, a resolution of the image may be determined based on the number of the sensing pixels included in the sensor, and a sensitivity of the image may be determined based on the amount of light incident on the sensing pixel. The amount of light incident on the sensing pixel may be determined based on a size of the sensing pixel. When the size of the sensing pixel increases, the amount of light incident on the sensing pixel and a dynamic range of the sensor may increase. Accordingly, a resolution of an image captured by the sensor may increase as the number of the sensing pixels included in the sensor increases. Also, the sensor may operate advantageously for capturing of a high sensitivity image even at a low illuminance as a size of a sensing pixel increases.

A volume of the capturing apparatus may be determined based on a focal length of a lens. For example, the volume of the capturing apparatus may be determined based on a gap between the lens and a sensor. Because the sensor needs to be located at the focal length of the lens in order to collect light refracted by the lens, the sensor and the lens included in the capturing apparatus may need to be spaced apart from each other by the focal length of the lens. The focal length of the lens may be determined based on a viewing angle of the capturing apparatus and a size of the lens (for example, a radius of an aperture of the lens). For example, when the viewing angle is fixed, the focal length may increase in proportion to the size of the lens. Also, the size of the lens may be determined based on a size of the sensor. For example, to capture an image within a predetermined range of viewing angles, the size of the lens may need to increase as the size of the sensor increases.

As described above, to increase a sensitivity of an image while maintaining a viewing angle and a resolution of the image, the volume of the capturing apparatus may be increased. For example, to increase a sensitivity of an image while maintaining a resolution of the image, a size of each of sensing pixels included in a sensor may need to increase while maintaining a number of the sensing pixels. Accordingly, a size of the sensor may increase. In this example, to maintain the viewing angle, a size of a lens may increase as the size of the sensor increases, and a focal length of the lens may increase. Thus, the volume of the capturing apparatus may increase.

To reduce the volume of the capturing apparatus, design schemes of reducing a size of a sensing pixel while maintaining a resolution of the sensor, or of reducing the resolution of the sensor while maintaining the size of the sensing pixel may be used. In an example, when the size of the sensing pixel is reduced while maintaining the resolution of the sensor, a size of the sensor and the focal length of the lens may decrease, which may lead to a decrease in the volume of the capturing apparatus. However, in this example, a sensitivity of the image may also decrease, and a quality of a low illuminance image may be reduced. In another example, when the resolution of the sensor is reduced while maintaining the size of the sensing pixel, the size of the sensor and the focal length of the lens may decrease, which may lead to a decrease in the volume of the capturing apparatus. However, in this example, a resolution of an image may be reduced.

The following exemplary embodiments may provide a technology of reducing the volume of the capturing apparatus while satisfying a desired viewing angle, a desired resolution and a desired sensitivity. Referring to FIG. 1, the capturing apparatus includes a lens array 110 and a sensor 120. The lens array 110 includes lenses, and the sensor 120 includes sensing pixels.

For example, when a size of each of the lenses included in the lens array 110 decreases, that is, when a number of lenses included in the same area increases, a focal length of each of the lenses and a thickness of the capturing apparatus may decrease. In this example, an original high resolution image may be restored by combining low resolution images captured by the lens array 110. Thus, a thin camera may be implemented by dividing the lenses in the lens array 110.

Each of the lenses in the lens array 110 may cover a predetermined area of the sensor 120 corresponding to a size of each of the lenses. Light passing through each of the lenses may be incident on sensing pixels included in the area of the sensor 120. Each of the sensing pixels in the sensor 120 may generate sensing information based on light passing through the lenses. For example, sensing pixels 121 and 122 may generate sensing information based on light entering through a lens 111, and a sensing pixel 123 may generate sensing information based on light entering through the lens 111 and a lens 112. The capturing apparatus may determine pixel values corresponding to viewpoints included in a field of view (FoV) of the capturing apparatus based on sensing information output by the sensor 120, and may generate a captured image based on the determined pixel values. In this example, a number of distinguishable viewpoints may be determined based on a diversity of sensing information. When the diversity of sensing information increases, the number of distinguishable viewpoints and a resolution of the captured image may increase.

The diversity of sensing information may be determined based on a combination of viewpoints represented by light incident on each of the sensing pixels. For example, when light corresponding to a first viewpoint through a third viewpoint is provided to the sensing pixels 121 through 123, the diversity of sensing information may increase, in comparison to when light corresponding to the first viewpoint is provided to the sensing pixels 121 through 123.

When the diversity of sensing information is sufficiently secured and when a full rank relationship between the sensing information and the pixel values corresponding to the viewpoints in the FoV of the capturing apparatus is formed, a captured image corresponding to a maximum resolution of the sensor 120 may be derived. The diversity of sensing information may be secured based on parameters of the capturing apparatus, for example, a number of the lenses in the lens array 110 or a number of the sensing pixels in the sensor 120.

Figure 2:
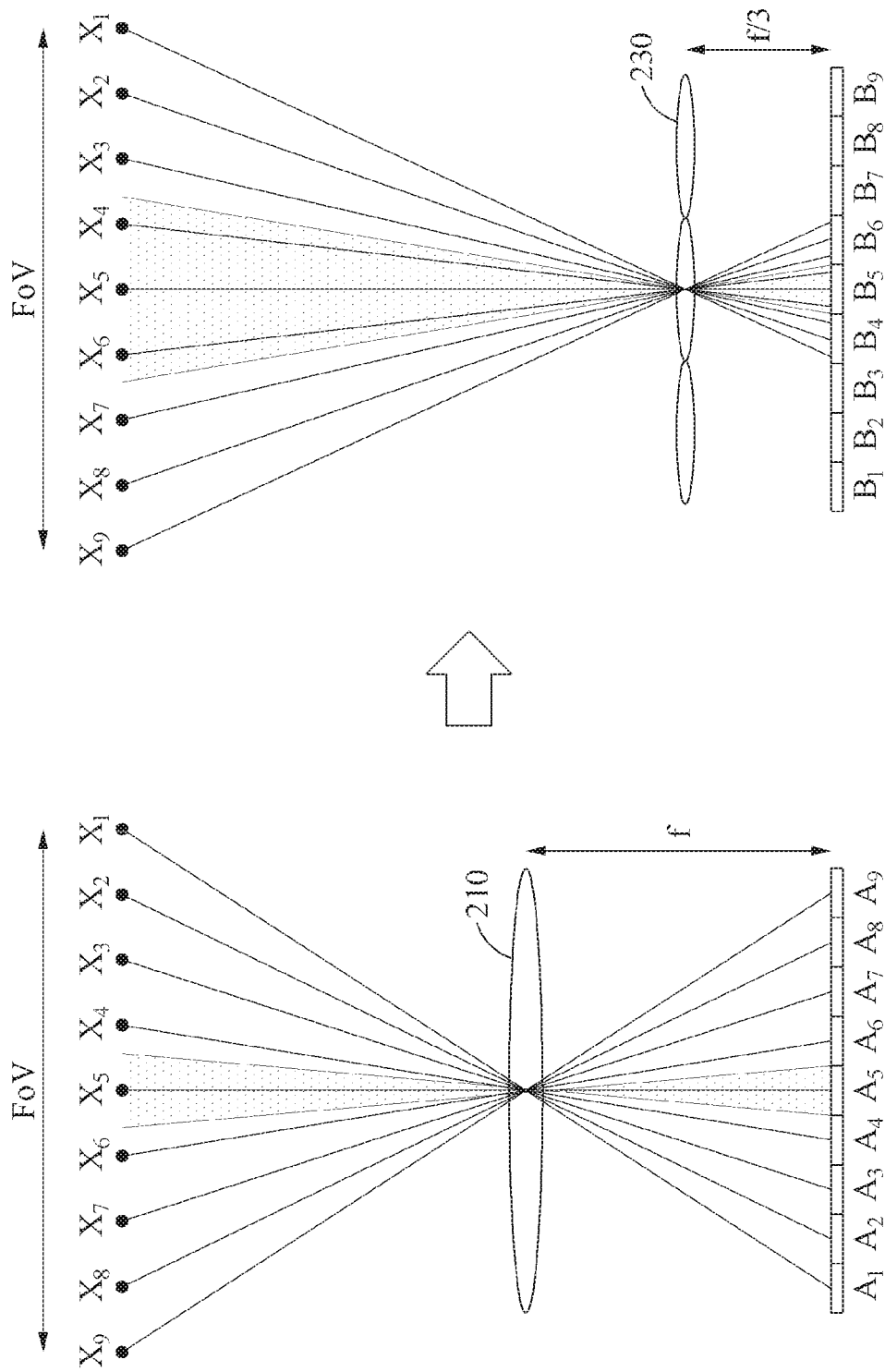
FIG. 2 is a diagram illustrating an influence of a size of a lens according to an exemplary embodiment.

FIG. 2 is a diagram illustrating an influence of a size of a lens according to an exemplary embodiment. Referring to FIG. 2, an FoV provided by a lens 210 is the same as an FoV provided by lenses 230, and a number of the lenses 230 is three times the lens 210. A focal length of the lenses 230 may be reduced to ⅓ of a focal length of the lens 210.

Light may be incident on sensing pixels $A_1$, $A_2$, $A_3$, $A_4$, $A_5$, $A_6$, $A_7$, $A_8$ and $A_9$ through the lens 210. Light corresponding to viewpoints $X_1$, $X_2$, $X_3$, $X_4$, $X_5$, $X_6$, $X_7$, $X_8$ and $X_9$ included in an FoV of a capturing apparatus may be uniformly incident on the sensing pixels $A_1$ through $A_9$. For example, light corresponding to the viewpoint $X_5$ may be incident on the sensing pixel $A_5$. Accordingly, a pixel value corresponding to the viewpoint $X_5$ may be restored based on sensing information output by the sensing pixel $A_5$.

Light may be incident on sensing pixels $B_1$, $B_2$, $B_3$, $B_4$, $B_5$, $B_6$, $B_7$, $B_8$ and $B_9$ through the lenses 230. Light corresponding to viewpoints $X_1$ through $X_9$ included in the FoV may be superimposedly incident on the sensing pixels $B_1$ through $B_9$. For example, light corresponding to the viewpoints $X_4$ through $X_6$ may be incident on the sensing pixel $B_5$. Accordingly, a pixel value corresponding to the viewpoints $X_4$ through $X_6$ may be restored based on sensing information output by the sensing pixel $B_5$.

When the lens 210 is used, viewpoints may be precisely identified from each other, in comparison to when the lenses 230 are used. For example, a resolution of an image captured using the lens 210 may be higher than a resolution of an image captured using the lens 230. When a multi-lens is used, a reduction in a resolution may need to be prevented by properly adjusting parameters of the capturing apparatus.

Figure 3:
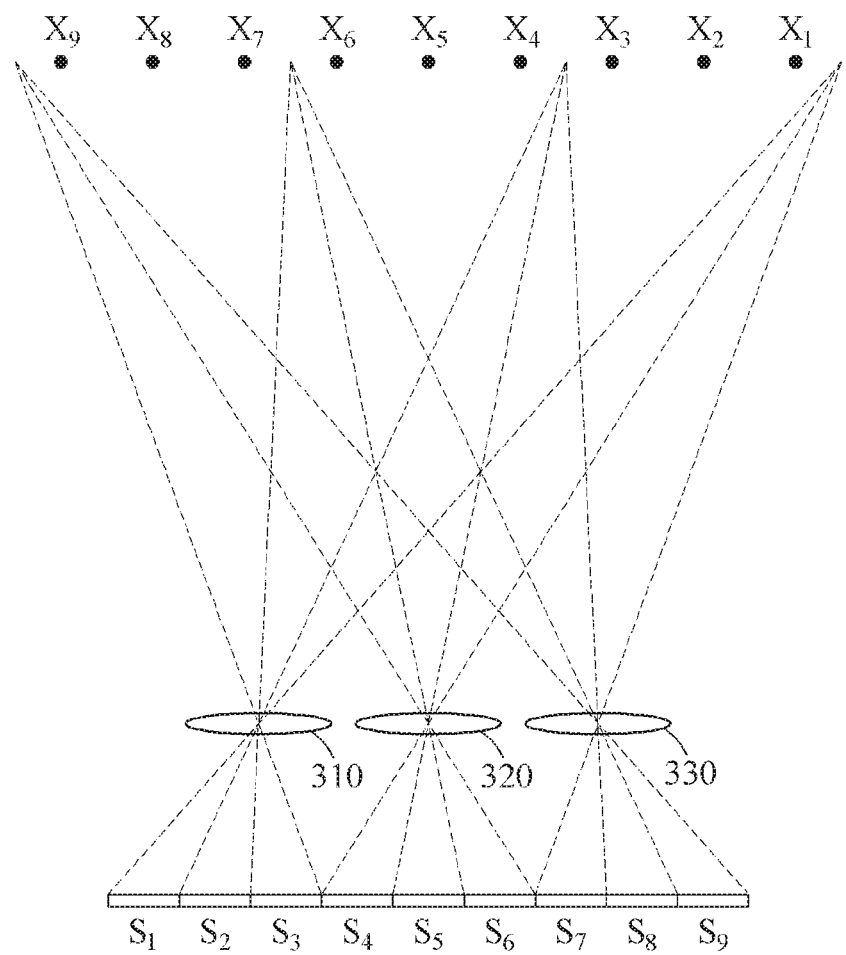
FIG. 3 is a diagram illustrating an example of light incident on sensing pixels by a lens array according to an exemplary embodiment.

FIG. 3 is a diagram illustrating an example of light incident on sensing pixels by a lens array according to an exemplary embodiment. In FIG. 3, light is incident on sensing pixels $S_1$, $S_2$, $S_3$, $S_4$, $S_5$, $S_6$, $S_7$, $S_8$ and $S_9$ through lenses 310, 320 and 330.

Sensing information generated by the sensing pixels $S_1$ through $S_3$, sensing information generated by the sensing pixels $S_4$ through $S_6$, and sensing information generated by the sensing pixels $S_7$ through $S_9$ may overlap. Accordingly, when a capturing apparatus has a structure of FIG. 3, it may be difficult for the capturing apparatus to obtain all pixel values corresponding to capturing viewpoints $X_1$, $X_2$, $X_3$, $X_4$, $X_5$, $X_6$, $X_7$, $X_8$ and $X_9$, and the capturing apparatus may restore a captured image based on a resolution lower than a maximum resolution. The sensing information generated by the sensing pixels $S_1$ through $S_9$ may be represented as shown in Equation 1 below.

$$\begin{bmatrix} I_1 \\ I_2 \\ I_3 \\ I_4 \\ I_5 \\ I_6 \\ I_7 \\ I_8 \\ I_9 \end{bmatrix} = \begin{bmatrix} 1 & 1 & 1 & 0 & 0 & 0 & 0 & 0 & 0 \\ 0 & 0 & 0 & 1 & 1 & 1 & 0 & 0 & 0 \\ 0 & 0 & 0 & 0 & 0 & 0 & 1 & 1 & 1 \\ 1 & 1 & 1 & 0 & 0 & 0 & 0 & 0 & 0 \\ 0 & 0 & 0 & 1 & 1 & 1 & 0 & 0 & 0 \\ 0 & 0 & 0 & 0 & 0 & 0 & 1 & 1 & 1 \\ 1 & 1 & 1 & 0 & 0 & 0 & 0 & 0 & 0 \\ 0 & 0 & 0 & 1 & 1 & 1 & 0 & 0 & 0 \\ 0 & 0 & 0 & 0 & 0 & 0 & 1 & 1 & 1 \end{bmatrix} \begin{bmatrix} P_1 \\ P_2 \\ P_3 \\ P_4 \\ P_5 \\ P_6 \\ P_7 \\ P_8 \\ P_9 \end{bmatrix} \quad \text{[Equation 1]}$$

In Equation 1, $I_1$ through $I_9$ denote the sensing information generated by the sensing pixels $S_1$ through $S_9$, and $P_1$ through $P_9$ denote the pixel values corresponding to the capturing viewpoints $X_1$ through $X_9$. When an inverse matrix $T^{-1}$ of a transformation matrix T for transforming a pixel value matrix P to a sensing information matrix I is provided, all the pixel values $P_1$ through $P_9$ may be obtained, and accordingly the captured image with the maximum resolution may be restored from the sensing information $I_1$ through $I_9$. For the inverse matrix $T^{-1}$, the transformation matrix T may need to have a full rank. Thus, the parameters of the capturing apparatus may be adjusted so that the transformation matrix T may have a full rank.

Figure 4:
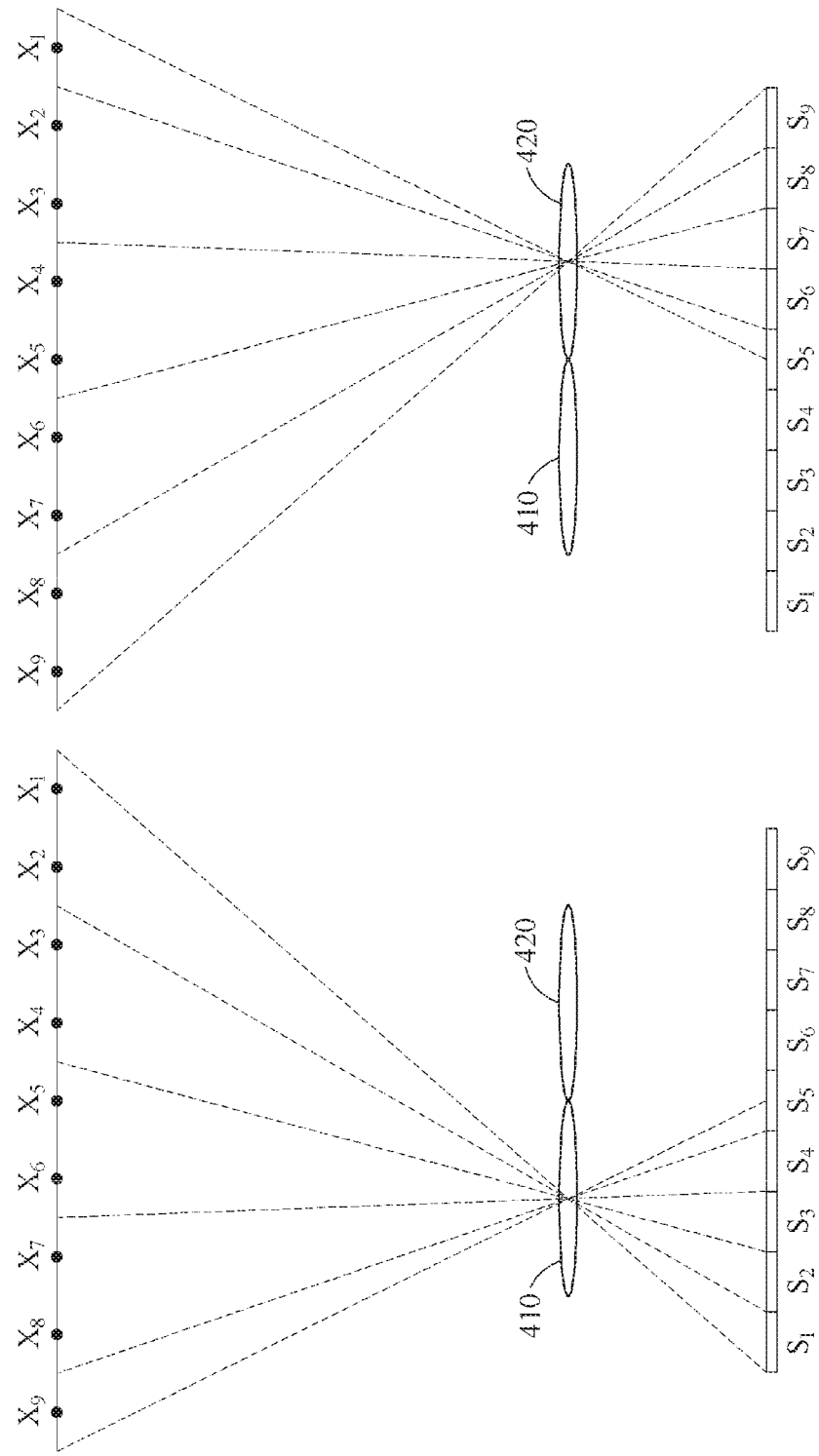
FIG. 4 is a diagram illustrating another example of light incident on sensing pixels by a lens array according to an exemplary embodiment.

FIG. 4 is a diagram illustrating another example of light incident on sensing pixels by a lens array according to an exemplary embodiment. In FIG. 4, light is incident on sensing pixels $S_1$, $S_2$, $S_3$, $S_4$, $S_5$, $S_6$, $S_7$, $S_8$ and $S_9$ through lenses 410 and 420.

When light with different patterns is incident on all sensing pixels, a transformation matrix T may have a full rank. When light incident on each of the sensing pixels corresponds to different combinations of viewpoints, the transformation matrix T may have the full rank. For example, light incident on the sensing pixel $S_1$ may correspond to a combination of the viewpoints $X_1$ and $X_2$, and light incident on the sensing pixel $S_2$ may correspond to a combination of the viewpoints $X_3$ and $X_4$. Accordingly, the light incident on the sensing pixels $S_1$ through $S_9$ may correspond to different combinations of the viewpoints $X_1$ through $X_9$. Sensing information generated by the sensing pixels $S_1$ through $S_9$ may be represented as shown in Equation 2 below.

$$\begin{bmatrix} I_1 \\ I_2 \\ I_3 \\ I_4 \\ I_5 \\ I_6 \\ I_7 \\ I_8 \\ I_9 \end{bmatrix} = \begin{bmatrix} 1 & 1 & 0 & 0 & 0 & 0 & 0 & 0 & 0 \\ 0 & 0 & 1 & 1 & 0 & 0 & 0 & 0 & 0 \\ 0 & 0 & 0 & 0 & 1 & 1 & 0 & 0 & 0 \\ 0 & 0 & 0 & 0 & 0 & 0 & 1 & 1 & 0 \\ 1 & 0 & 0 & 0 & 0 & 0 & 0 & 0 & 1 \\ 0 & 1 & 1 & 0 & 0 & 0 & 0 & 0 & 0 \\ 0 & 0 & 0 & 1 & 1 & 0 & 0 & 0 & 0 \\ 0 & 0 & 0 & 0 & 0 & 1 & 1 & 0 & 0 \\ 0 & 0 & 0 & 0 & 0 & 0 & 0 & 1 & 1 \end{bmatrix} \begin{bmatrix} P_1 \\ P_2 \\ P_3 \\ P_4 \\ P_5 \\ P_6 \\ P_7 \\ P_8 \\ P_9 \end{bmatrix} \quad \text{[Equation 2]}$$

In Equation 2, $I_1$ through $I_9$ denote the sensing information generated by the sensing pixels $S_1$ through $S_9$, and $P_1$ through $P_9$ denote pixel values corresponding to the viewpoints $X_1$ through $X_9$. Based on Equation 2, the same number of the pixel values $P_1$ through $P_9$ corresponding to an unknown quantity as a number of different relationships may be secured. Accordingly, in Equation 2, a transformation matrix T may be determined to have a full rank.

A capturing apparatus may obtain an inverse matrix $T^{-1}$ of a transformation matrix T for transforming a pixel value matrix P to a sensing information matrix I. The capturing apparatus may obtain all the pixel values $P_1$ through $P_9$ based on Equation 3, and may restore a captured image with a maximum resolution based on the pixel values $P_1$ through $P_9$.

$$P = T^{-1} \cdot I \quad \text{[Equation 3]}$$

The inverse matrix $T^{-1}$ may be determined based on a corresponding relationship between the sensing pixels $S_1$ through $S_9$ and the viewpoints $X_1$ through $X_9$, and may be stored in advance in the capturing apparatus. The capturing apparatus may determine the pixel value matrix P based on the stored inverse matrix $T^{-1}$ and the sensing information matrix I.

When nine sensing pixels and two lenses are provided as shown in FIG. 4, light may be provided to "4.5" pixels per lens. For example, when "4001" sensing pixels and "100" lenses are provided, light may be provided to "40.01" pixels per lens. In this example, a first lens may cover a lens offset of "0" through "40.01," a second lens may cover a lens offset of "40.01" through "80.02," and a third lens may cover a lens offset of "80.02" through "120.03." Also, a last lens that is a hundredth lens may cover a lens offset of "3960.99" through "4001." When a number of sensing pixels and a number of lenses are relatively prime, that is, when a ratio between the number of the sensing pixels and the number of the lenses is a real number, not an integer, the transformation matrix T may have a full rank.

When the number of the sensing pixels and the number of the lenses are relatively prime, and when the ratio between the number of the sensing pixels and the number of the lenses is a real number, not an integer, at least a portion of sensing pixels in a sensor may generate sensing information based on light entering through different lenses in a lens array. For example, the sensing pixel $S_5$ may generate sensing information based on light entering through the lens 410 and light entering through the lens 420. When at least a portion of the sensing pixels in the sensor generate sensing information based on light entering through different lenses in the lens array, the transformation matrix T may have the full rank.

According to an exemplary embodiment, parameters of the capturing apparatus may be determined so that light with different patterns may be incident on all sensing pixels or that light incident on each of the sensing pixels may correspond to different combinations of viewpoints. Also, the parameters of the capturing apparatus may be determined so that at least a portion of the sensing pixels in the sensor may generate sensing information based on light entering through different lenses in the lens array. The parameters of the capturing apparatus may include, for example, a number of sensing pixels and a number of lenses. The number of the sensing pixels and the number of the lenses may be determined to be relatively prime, or a ratio between the number of the sensing pixels and the number of the lenses may be determined as a real number, not an integer. Thus, it is possible to derive a captured image with the maximum resolution using a multi-lens.

Figure 5:
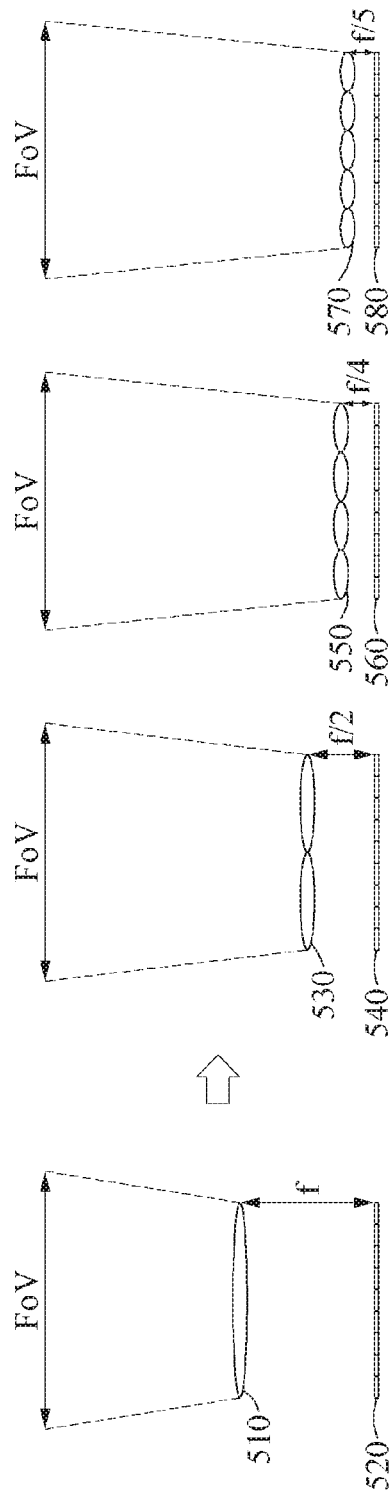
FIG. 5 is a diagram illustrating a relationship between a number of lenses and a focal length according to an exemplary embodiment.

FIG. 5 is a diagram illustrating a relationship between a number of lenses and a focal length according to an exemplary embodiment. Referring to FIG. 5, a number of lenses 530 is relatively prime to a number of sensing pixels 540, a number of lenses 550 is relatively prime to a number of sensing pixels 560, and a number of lenses 570 is relatively prime to a number of sensing pixels 580. Accordingly, by the lenses 530, 550 and 570 and the sensing pixels 540, 560 and 580, a transformation matrix T may have a full rank. When the transformation matrix T has the full rank, a focal length of a lens array may be determined based on a characteristic of an application to which a capturing apparatus is applied. For example, when a sensor of a camera is set and a target thickness to a lens and a viewing angle of the camera are determined, a number of lenses in the lens array may be determined.

In FIG. 5, the same FoV may be provided by a lens 510 and the lenses 530, 550, and 570. Each of focal lengths of the lenses 510, 530, 550 and 570 may be inversely proportional to a number of the lenses 510, 530, 550 and 570. For example, because the number of the lenses 530 is twice a number of the lens 510, a focal length of the lenses 530 may be ½ of a focal length of the lens 510. Similarly, a focal length of the lenses 550 may be ¼ of the focal length of the lens 510, and a focal length of the lenses 570 may be ⅕ of the focal length of the lens 510. Accordingly, a focal length of a lens array may be adjusted based on a number of lenses included in the lens array. By adjusting the number of the lenses in the lens array, the focal length of the lens array may be reduced, which may realize a thin camera.

Figure 6:
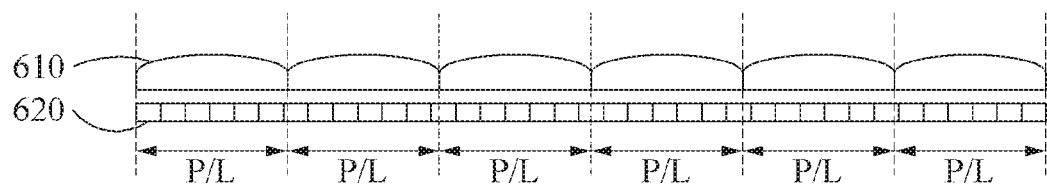
FIG. 6 is a diagram illustrating a cross section of a lens array and a sensor according to an exemplary embodiment.

FIG. 6 is a diagram illustrating a cross section of a lens array 610 and a sensor 620 according to an exemplary embodiment. In FIG. 6, L denotes a number of lenses included in the lens array 610, and P denotes a number of sensing pixels included in the sensor 620. Accordingly, P/L denotes a ratio between the number P of the sensing pixels and the number L of the lenses. Each of the lenses may cover the same number of sensing pixels as a pixel offset corresponding to P/L. As described above, when P/L is a real number, not an integer, a resolution of a captured image may be maximized. Thus, in a process of designing a capturing apparatus, at least one of P or L may be adjusted so that P/L may be a real number, not an integer. In FIG. 6, P and L are "37" and "6," respectively, and accordingly the resolution of the captured image may be maximized.

Figure 7:
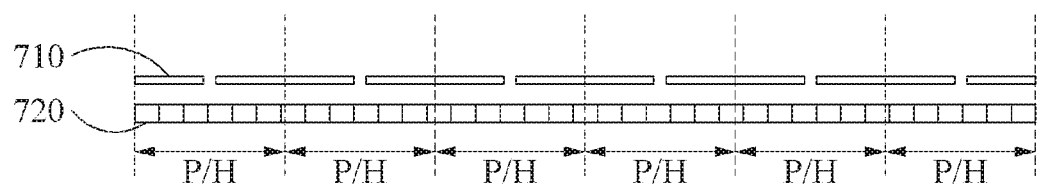
FIG. 7 is a diagram illustrating a cross section of a pinhole mask and a sensor according to an exemplary embodiment.

FIG. 7 is a diagram illustrating a cross section of a pinhole mask 710 and a sensor 720 according to an exemplary embodiment. In FIG. 7, P denotes a number of sensing pixels included in the sensor 720, and H denotes a number of pinholes included in the pinhole mask 710. The above description may be applicable to an optical system in addition to a lens. In FIG. 7, a pinhole may be applied instead of a lens. P/H denotes a ratio between the number P of the sensing pixels and the number H of the pinholes. Each of the pinholes may cover the same number of sensing pixels as a pixel offset corresponding to P/H. Similarly to the above description, when P/H is a real number, not an integer, a resolution of a captured image may be maximized. Thus, in a process of designing a capturing apparatus, at least one of P or H may be adjusted so that P/H may be a real number, not an integer. In FIG. 7, P and H are "37" and "6," respectively, and accordingly the resolution of the captured image may be maximized.

Figure 8:
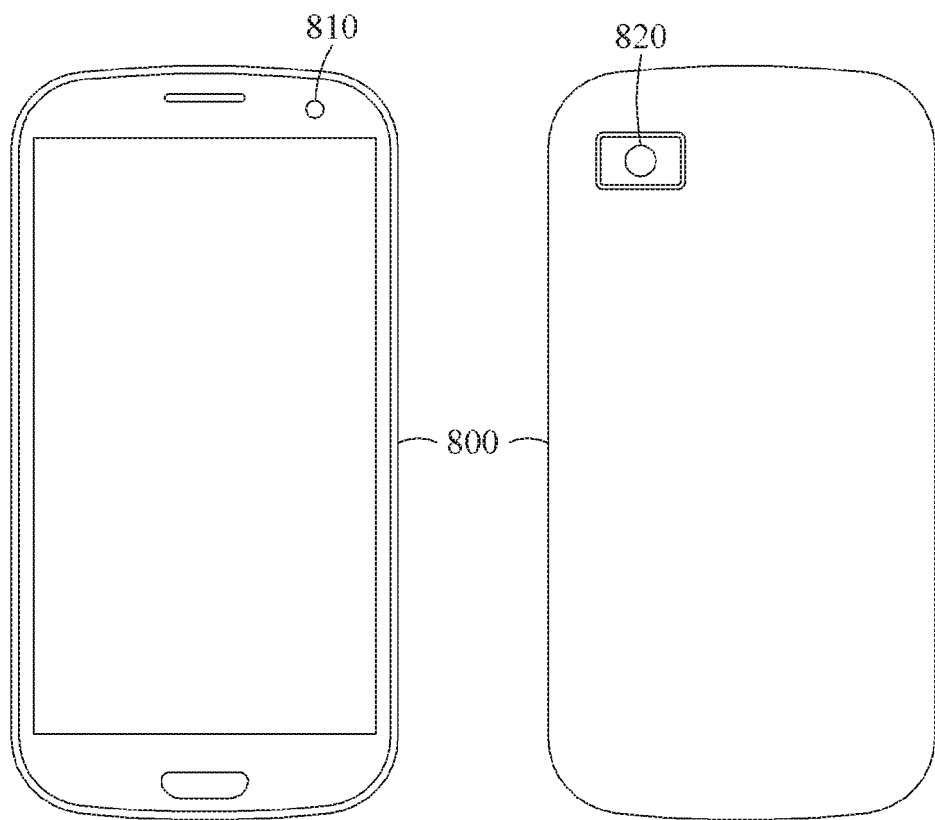
FIG. 8 is a diagram illustrating a mobile device according to an exemplary embodiment.

FIG. 8 is a diagram illustrating a mobile device 800 according to an exemplary embodiment. In FIG. 8, the mobile device 800 includes a capturing apparatus 810. According to an exemplary embodiment, reducing of a volume of the mobile device 800 may be important in a design. The mobile device 800 may be a smartphone as shown in FIG. 8, however, there is no limitation thereto. The mobile device 800 may include, for example, a wearable device such as a smart watch, a smart band or smart glasses. According to an exemplary embodiment, reducing a volume of a wearable device may be more important in a design. As described above, the capturing apparatus 810 may include a multi-lens, and a thickness of the capturing apparatus 810 may be adjusted based on a number of individual lenses included in the multi-lens. Thus, the mobile device 800 may be free from a limitation of a volume by the thickness of the capturing apparatus 810.

Figure 9:
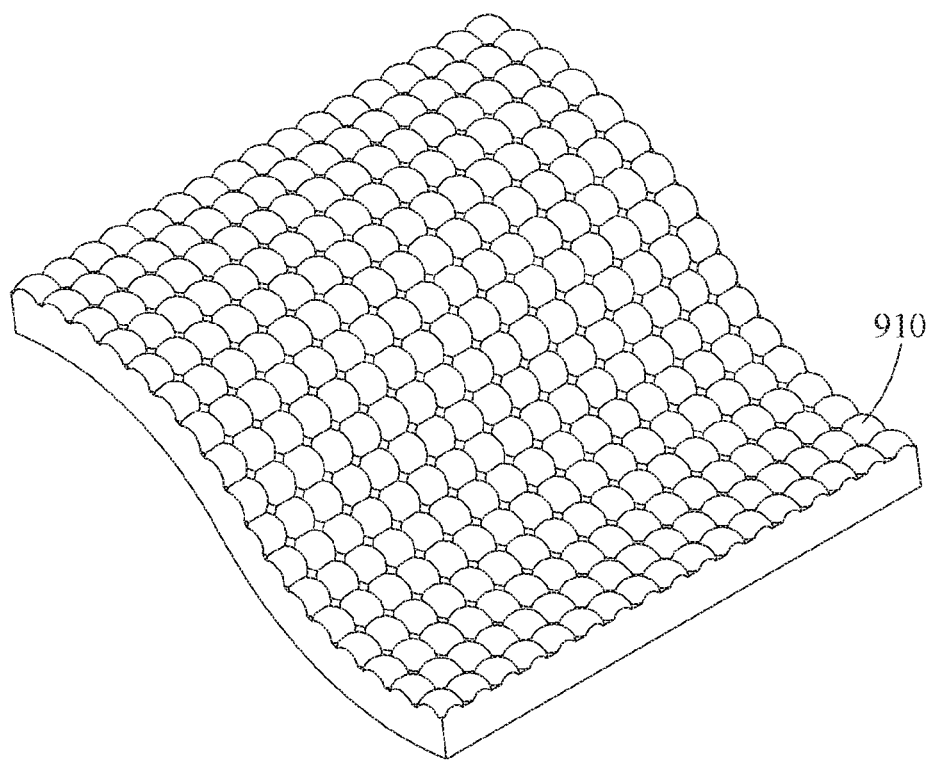
FIG. 9 is a diagram illustrating a curved lens array according to an exemplary embodiment.

FIG. 9 is a diagram illustrating a curved lens array 910 according to an exemplary embodiment. The curved lens array 910 may include a plurality of lenses as described above, and accordingly may be designed to be curved by a connection portion between the lenses. Also, the curved lens array 910 may be designed so that light incident on each sensing pixel may correspond to different combinations of viewpoints in a curved state. The curved lens array 910 may be used for a curved device, for example, a curved smartphone.

Figure 10:
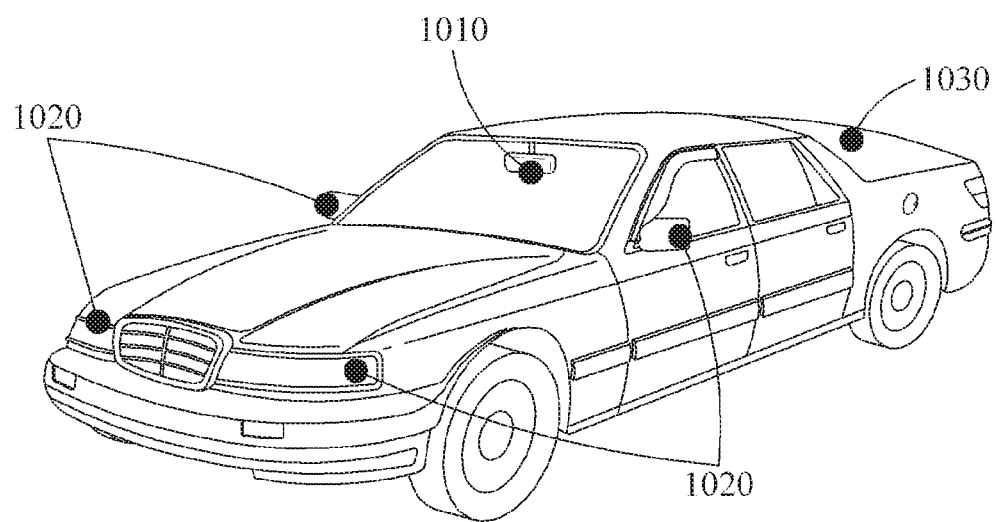
FIG. 10 is a diagram illustrating a smart vehicle according to an exemplary embodiment.

FIG. 10 is a diagram illustrating a smart vehicle according to an exemplary embodiment. Referring to FIG. 10, the smart vehicle may include capturing apparatuses at points 1010, 1020 and 1030. Thicknesses of the capturing apparatuses may be adjusted based on a number of lenses included in a multi-lens, and thus the capturing apparatuses may be installed in the smart vehicle instead of hindering a design or safety aspect.

Figure 11:
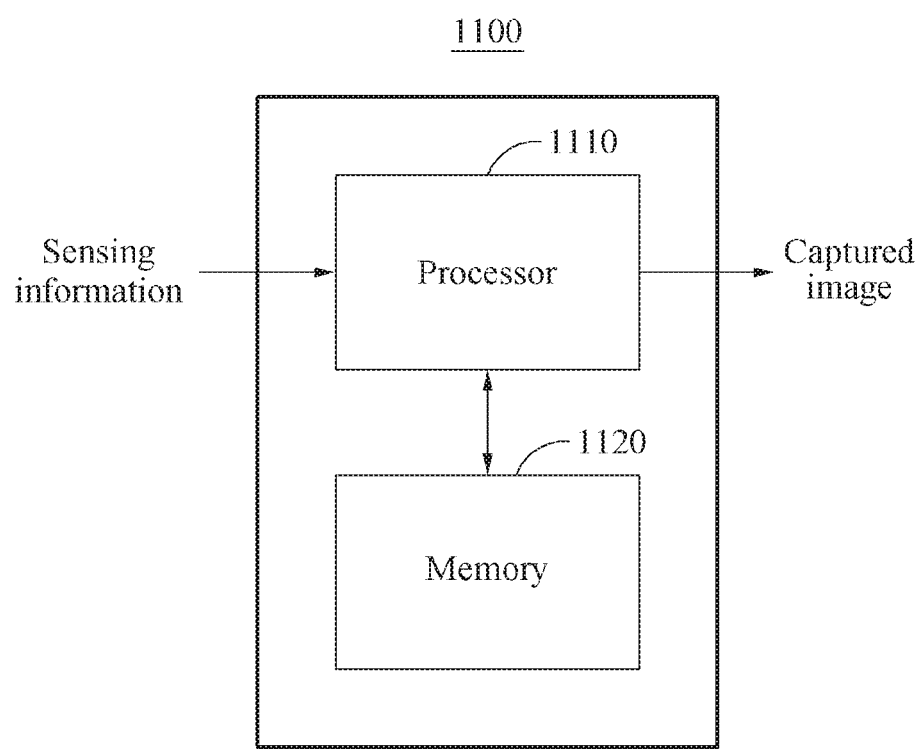
FIG. 11 is a block diagram illustrating a capturing apparatus according to an exemplary embodiment.

FIG. 11 is a block diagram illustrating a capturing apparatus 1100 according to an exemplary embodiment. Referring to FIG. 11, the capturing apparatus 1100 includes a processor 1110 and a memory 1120.

The processor 1110 may perform at least one of the above-described methods. For example, the processor 1110 may process the above-described capturing operation. The processor 1110 may acquire sensing information from sensing pixels and may generate a captured image based on the sensing information. The memory 1120 may store computer-readable instructions. For example, when instructions stored in the memory 1120 are executed by the processor 1110, the processor 1110 may process the above-described capturing operation. Also, the memory 1120 may store data for capturing, for example, an inverse matrix determined based on a corresponding relationship between sensing pixels and viewpoints.

The processor 1110 may execute instructions or program codes, or may control the capturing apparatus 1100. The capturing apparatus 1100 may be connected to an external device (for example, a personal computer (PC) or a network) via an input/output device (not shown), and may exchange data with the external device. The capturing apparatus 1100 may be implemented as at least a portion of, for example, a mobile device such as a mobile phone, a smartphone, a personal digital assistant (PDA), a netbook, a tablet computer or a laptop computer, a computing device such as a desktop computer, an electronic product such as a television (TV), a smart TV or a security device for gate control, and a smart vehicle. The above description is also applicable to the capturing apparatus 1100, and accordingly is not repeated here.

Figure 12:
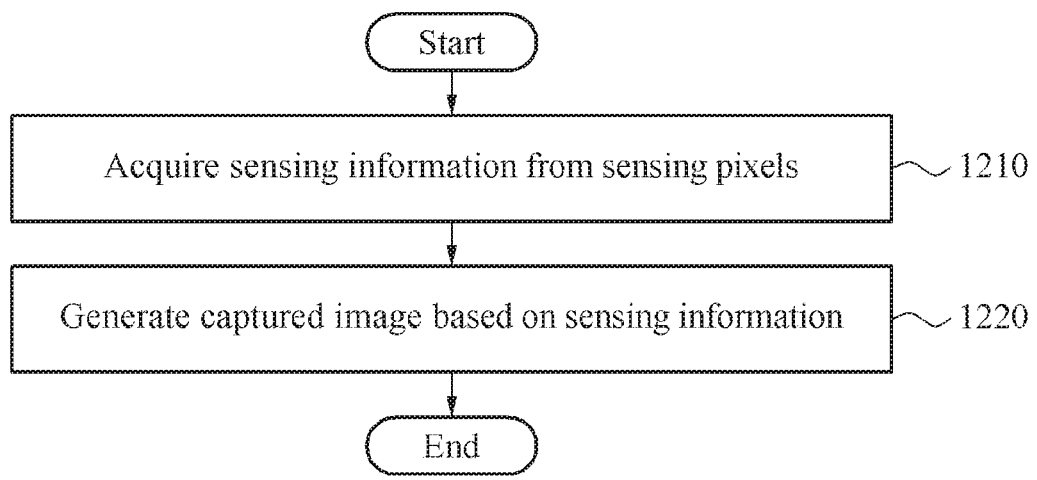
FIG. 12 is a flowchart illustrating a capturing method according to an exemplary embodiment.

FIG. 12 is a flowchart illustrating a capturing method according to an exemplary embodiment. Referring to FIG. 12, in operation 1210, a capturing apparatus acquires sensing information from sensing pixels. In operation 1220, the capturing apparatus generates a captured image based on the 'sensing information. At least a portion of the sensing pixels may generate the sensing information based on light entering through different lenses in a lens array. Light incident on each of the sensing pixels may correspond to different combinations of viewpoints. The above description is also applicable to the capturing method of FIG. 12, and accordingly is not repeated here.

The exemplary embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, non-transitory computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable storage medium including program instructions to implement various operations which may be performed by a computer. The non-transitory computer-readable medium may also include, alone or in combination with the program instructions, data files, data structures, and the like. The program instructions recorded on the non-transitory computer-readable medium may be those specially designed and constructed for the purposes of the exemplary embodiments. Examples of non-transitory computer-readable medium include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

While this disclosure includes exemplary embodiments, it will be apparent to one of ordinary skill in the art that various changes in form and details may be made in these exemplary embodiments without departing from the spirit and scope of the claims and their equivalents. The exemplary embodiments described herein are to be considered in a descriptive sense only, and not for purposes of limitation. Descriptions of features or aspects in each exemplary embodiment are to be considered as being applicable to similar features or aspects in other exemplary embodiments. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A capturing apparatus comprising:
a lens array comprising a plurality of lenses; and
a sensor comprising a plurality of sensing pixels,
wherein the lens array is disposed on the sensor in misalign condition, and a transformation matrix between a first matrix of pixel values generated by the sensing pixels and a second matrix of visual information of spots to be sensed is allowed to be full rank.

2. The capturing apparatus of claim 1, wherein at least a portion of the plurality of sensing pixels in the sensor is configured to generate at least a portion of the pixel values based on light entering through different lenses in the lens array.

3. The capturing apparatus of claim 1, wherein light incident on each sensing pixel corresponds to different combinations of spots to be sensed.

4. The capturing apparatus of claim 1, wherein a number of the plurality of sensing pixels in the sensor and a number of the plurality of lenses in the lens array are relatively prime.

5. The capturing apparatus of claim 1, wherein a ratio between a number of the plurality of sensing pixels and a number of the plurality of lenses is a real number.

6. The capturing apparatus of claim 1, further comprising:
a processor configured to generate a captured image based on the first matrix and the transformation matrix.

7. The capturing apparatus of claim 6, wherein the processor is further configured to:
generate the first matrix based on the pixel values generated by the sensing pixels,
determine the second matrix based on the first matrix and the transformation matrix, and
generate the captured image based on the second matrix.

8. The capturing apparatus of claim 1, wherein a focal length of the lens array is determined based on a number of lenses in the lens array.

9. The capturing apparatus of claim 1, wherein a focal length of the lens array decreases when a number of lenses in the lens array increases.

10. The capturing apparatus of claim 1, wherein the capturing apparatus corresponds to a thin camera.

11. A capturing method comprising:
acquiring pixel values from a plurality of sensing pixels in a sensor; and
generating a captured image based on the pixel values,
wherein a lens array comprising a plurality of lenses is disposed on the sensor in misalign condition, and a transformation matrix between a first matrix of pixel values generated by the sensing pixels and a second matrix of visual information of spots to be sensed is allowed to be full rank.

12. The capturing method of claim 11, wherein at least a portion of the plurality of sensing pixels is configured to generate at least a portion of the pixel values based on light entering through different lenses in the lens array.

13. The capturing method of claim 11, wherein light incident on each sensing pixel corresponds to different combinations of spots to be sensed.

14. The capturing method of claim 11, wherein a number of the plurality of sensing pixels and a number of the plurality of lenses in the lens array are relatively prime.

15. The capturing method of claim 11, wherein a ratio between a number of the plurality of sensing pixels and a number of the plurality of lenses is a real number.

16. A capturing apparatus comprising:
a lens array comprising a plurality of lenses; and
a sensor comprising a plurality of sensing pixels,
wherein the lens array is disposed on the sensor in misalign condition, and light incident on each sensing pixel corresponds to different combinations of visual information of spots to be sensed.

17. The capturing apparatus of claim 16, wherein a transformation matrix between a first matrix of pixel values generated by the sensing pixels and a second matrix of visual information of spots to be sensed is allowed to be full rank.

18. The capturing apparatus of claim 16, wherein at least a portion of the plurality of sensing pixels in the sensor is configured to generate at least a portion of the pixel values based on light entering through different lenses in the lens array.

19. The capturing apparatus of claim 16, wherein a number of the plurality of sensing pixels in the sensor and a number of the plurality of lenses in the lens array are relatively prime.

20. The capturing apparatus of claim 16, wherein a ratio between a number of the plurality of sensing pixels and a number of the plurality of lenses is a real number.

21. A smart phone comprising:
a camera generating image information;
a memory storing computer-readable instructions; and
a processor processing the image information based on the computer-readable instructions,
wherein the camera comprising:
a lens array comprising a plurality of lenses; and
a sensor comprising a plurality of sensing pixels,
wherein the lens array is disposed on the sensor in misalign condition, and a transformation matrix between a first matrix of pixel values generated by the sensing pixels and a second matrix of visual information of spots to be sensed is allowed to be full rank.

22. The smart phone of claim 21, wherein the camera is positioned at front of the smart phone or back of the smart phone.

23. The smart phone of claim 21, wherein the lens array is designed to be curved by connection portions of the plurality of the lenses.

24. A wearable device comprising:
a camera generating image information;
a memory storing computer-readable instructions; and
a processor processing the image information based on the computer-readable instructions,
wherein the camera comprising:
a lens array comprising a plurality of lenses; and
a sensor comprising a plurality of sensing pixels,
wherein the lens array is disposed on the sensor in misalign condition, and a transformation matrix between a first matrix of pixel values generated by the sensing pixels and a second matrix of visual information of spots to be sensed is allowed to be full rank.

25. The wearable device of claim 24, wherein the wearable device corresponds to one from among a smart watch, a smart band and smart glasses.

26. The wearable device of claim 24, wherein the lens array is designed to be curved by connection portions of the plurality of the lenses.

* * * * *